W. P. Elliott.
Caster.
No. 88,558.      Patented Apr. 6, 1869.
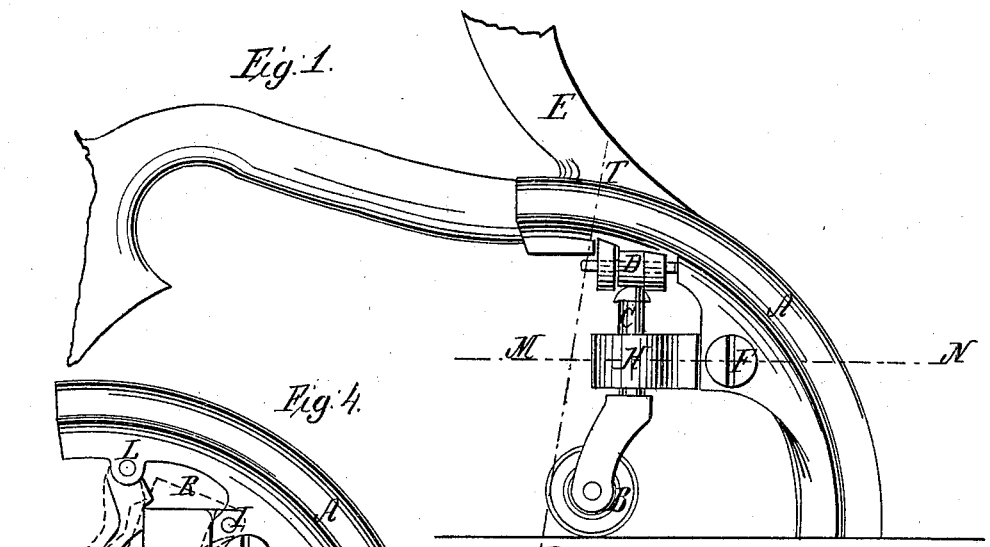
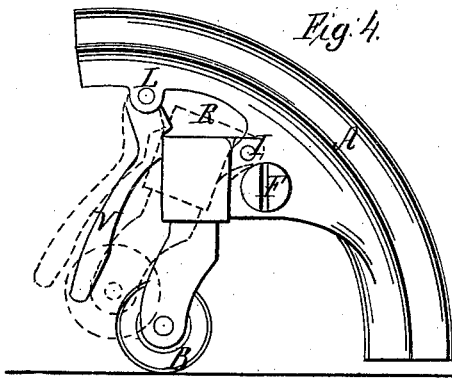
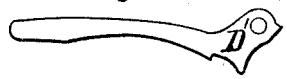
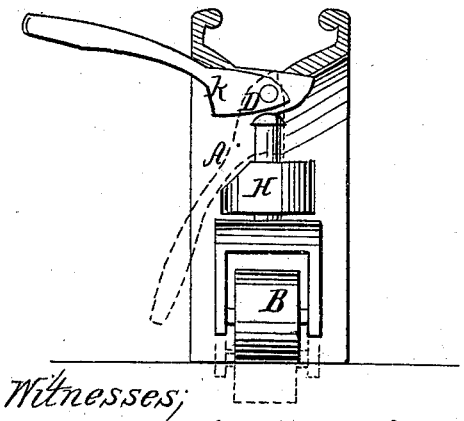
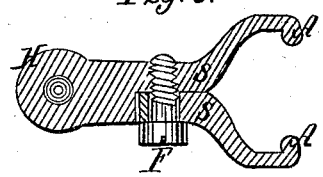
Witnesses:
M. B. Philipp
James Moore
Inventor:
William P. Elliott

UNITED STATES PATENT OFFICE.

WILLIAM P. ELLIOTT, OF CINCINNATI, OHIO.

IMPROVEMENT IN CASTER.

Specification forming part of Letters Patent No. 88,558, dated April 6, 1869.

*To all whom it may concern:*

Be it known that I, WILLIAM P. ELLIOTT, of Cincinnati, in the county of Hamilton and State of Ohio, have invented certain new and useful Improvements in Casters; and I do hereby declare that the following is a full, clear, and exact description of the construction and operation of the same, reference being had to the annexed drawings, making part of this specification, in which—

Figure 1 is a side view of my improved caster attached to its frame, the cam D being raised by the caster-stem, so that the sewing-machine rests upon its legs. Fig. 2 is a vertical section through the line P T, Fig. 1. Fig. 3 is a top view of a horizontal section through the line M N, Fig. 1. Fig. 4 is a side view of a caster and frame where the piece H' is reciprocally adjustable with the catch-lever V, the catch-lever V is down, and the sewing-machine rests upon the casters. Fig. 5 is a perspective view of the catch-lever D.

The object of my improvements is to provide adjustable casters for sewing or other machines, or articles of manufacture, by means of which the particular article may be supported upon the casters when it is desired to move it from place to place, and may rest firmly upon its legs when it is at rest; but, for the sake of illustration, the description will be confined to sewing-machines.

E, Fig. 1, is the termination of a sewing-machine leg. A is the frame, to which my adjustable caster is attached. This frame is composed of two curved pieces, which form the jaws A' A', and are fastened together by the screw F, as shown in Fig. 3. The sides of said frame also form the clamps S S.

c is the stem of the caster-frame, which works through the piece H. Said piece H is cast with or as part of one of the pieces of which the frame A is composed, as is clearly shown in Fig. 3. The stem c works loosely through the piece H, but is riveted at its upper end to prevent it from falling through the piece H when the machine to which it may be attached is raised.

D is a cam, which hangs loosely upon a pin or rivet, as shown, Fig. 1.

When the machine to which the casters are attached is raised, the caster B, by its gravity, falls down until the rivet on the top of the stem is caught by the piece H, and as the pressure of the stem c is withdrawn from the cam D it also falls by its own gravity to a vertical position, and, when the machine is again placed upon the floor, the upper end of the stem c is pushed, by the weight of the machine to which the caster is attached, firmly against the shoulder K of the cam D, Fig. 1, when the said machine may be moved upon the casters, and when it is desired that the machine should stand more firmly, for the purpose of better resistance to the motion of the mechanism, the cams D may be raised up, as shown in Figs. 1 and 2, when the weight of the machine will push the casters up, and the machine will rest upon its legs. The cam D may be pushed down by the foot of the operator, and the machine will then rest upon its casters; but in order that the cam may be operated by the foot it will be necessary that its handle or lever should be longer than that shown here, the length to depend on the weight of the article to which the casters are attached.

Of course, it will be understood that the frame A, which is virtually the extension of the leg of a sewing-machine, as shown in the drawings, is of such length that when the catch-lever V is down, as shown at Fig. 4, it will not reach to the floor; but when the cam D is up, as at Fig. 2, then it will touch the floor, and the machine will rest thereon.

The description has thus far been confined to cases where the piece H is stationary; but I propose by my invention to accomplish the same object by having the piece H' movable reciprocally with reference to the cam D or catch-lever V, the stem c being stationary in the piece H'. Fig. 4 shows mechanism adapted to that end, and the operation is the same, except as otherwise specified.

The letters used are those which refer to similar parts in the other drawings, except that the catch-lever shown in Fig. 4, and which is intended to perform a function analogous to that performed by the cam D in Figs. 1 and 2, is marked V.

I, Fig. 4, is a rivet, upon which the piece H', with its appendent caster, is hung, and which is the only attachment it has to the framework.

When the catch-lever O is raised, the weight of the sewing-machine pressing upon the caster B will push the piece H' up in the direction of the space R until the frame A rests upon the floor.

The pivot L, upon which the catch-lever V, Fig. 4, is hung, is placed at a point to the left of the point where the piece H' impinges upon the catch-lever V, and therefore, by virtue of a well-known law of mechanics, when the caster B rests on the floor the catch-lever affords a firm resistance to the piece H'.

The catch-lever D', Fig. 5, is intended to perform a function analogous to the cam D in the mechanism shown in Figs. 1 and 2; but it will be easily seen that when it is used it will be necessary to raise the machine to which it is attached, in order that the casters may fall down and the machine rest upon them.

Having thus described my invention, what I claim as new, and desire to secure by Letters Patent, is—

1. The catch-lever D', in combination with the piece H' and caster B, with its movable stem, as shown and described.

2. The jaws A' A', in combination with the clamps S S, screw F, and a caster, as shown and described.

WILLIAM P. ELLIOTT.

Witnesses:
    JAMES MOORE,
    M. B. PHILIPP.